(12) United States Patent
Sung et al.

(10) Patent No.: US 10,480,356 B2
(45) Date of Patent: Nov. 19, 2019

(54) CAMSHAFT DEVICE AND METHOD FOR MANUFACTURING CAMSHAFT DEVICE

(71) Applicant: KOREA AUTOMOTIVE TECHNOLOGY INSTITUTE, Chungcheongnam-do (KR)

(72) Inventors: Si Young Sung, Chungcheongnam-do (KR); Beom Suck Han, Gyeonggi-do (KR); Se Hoon Kim, Chungcheongnam-do (KR); Jae Hyuk Shin, Chungcheongnam-do (KR); Jin Pyeong Kim, Chungcheongnam-do (KR)

(73) Assignee: KOREA AUTOMOTIVE TECHNOLOGY INSTITUTE, Chungcheongnam-do (KR)

( * ) Notice: Subject to any disclaimer, the term of this patent is extended or adjusted under 35 U.S.C. 154(b) by 0 days.

(21) Appl. No.: 16/091,562

(22) PCT Filed: Apr. 3, 2017

(86) PCT No.: PCT/KR2017/003633
§ 371 (c)(1),
(2) Date: Oct. 5, 2018

(87) PCT Pub. No.: WO2017/176015
PCT Pub. Date: Oct. 12, 2017

(65) Prior Publication Data
US 2019/0107010 A1    Apr. 11, 2019

(30) Foreign Application Priority Data
Apr. 5, 2016    (KR) .................. 10-2016-0041581

(51) Int. Cl.
*F01L 1/047* (2006.01)
*B22D 25/02* (2006.01)
*B29C 45/00* (2006.01)
*F16D 1/06* (2006.01)
(Continued)

(52) U.S. Cl.
CPC ............... *F01L 1/047* (2013.01); *B21K 1/06* (2013.01); *B22D 25/02* (2013.01); *B29C 45/00* (2013.01);
(Continued)

(58) Field of Classification Search
CPC ....... F01L 1/047; F01L 1/0471; F01L 1/0473; F01L 1/0475; F01L 1/0476;
(Continued)

(56) References Cited

U.S. PATENT DOCUMENTS 4,597,365 A * 7/1986 Madaffer ............... F01L 1/047
123/90.6
2008/0060594 A1 * 3/2008 Cline ..................... F01L 1/047
123/90.6
(Continued)

FOREIGN PATENT DOCUMENTS

DE        23362411 A1    2/1975
DE        19831772 A1    1/1999
(Continued)

*Primary Examiner* — Prasad V Gokhale
(74) *Attorney, Agent, or Firm* — Mayer & Williams, PC; Stuart H. Mayer

(57) ABSTRACT

The present invention relates to a camshaft device, which allows a plurality of components to be assembled to a main shaft, and a method for manufacturing the camshaft device. The camshaft device may include: a main shaft lengthily extending in the lengthwise direction; at least one cam lobe assembled to the main shaft and formed eccentrically from a rotation axis of the main shaft; at least one journal bearing assembled to the main shaft and formed to rotatably support the main shaft; and at least one guide shaft assembled to the main shaft and installed between the cam lobe and another cam lobe so as to align an assembling position of the cam lobe or the journal bearing.

9 Claims, 6 Drawing Sheets

(51) Int. Cl.
*B21K 1/06* (2006.01)
*F16C 17/02* (2006.01)
*B22F 5/00* (2006.01)
*B29L 31/00* (2006.01)

(52) U.S. Cl.
CPC .............. *F16C 17/022* (2013.01); *F16D 1/06* (2013.01); *B22F 5/008* (2013.01); *B29L 2031/7484* (2013.01); *F01L 2001/0471* (2013.01); *F16C 2204/20* (2013.01); *F16C 2204/26* (2013.01); *F16C 2204/42* (2013.01); *F16C 2204/60* (2013.01); *F16C 2208/00* (2013.01); *F16C 2208/04* (2013.01); *F16C 2220/04* (2013.01); *F16C 2220/20* (2013.01); *F16C 2226/00* (2013.01); *F16C 2360/18* (2013.01)

(58) Field of Classification Search
CPC .. F01L 2001/0471; F16H 53/00; F16H 53/02; F16H 53/025; F16D 1/06
See application file for complete search history.

(56) References Cited

U.S. PATENT DOCUMENTS

2010/0230037 A1 9/2010 Lee
2017/0312804 A1* 11/2017 Lindner ............... B21D 53/845

FOREIGN PATENT DOCUMENTS

| | | |
|---|---|---|
| FR | 552028 | 4/1923 |
| JP | 60-138215 | 7/1985 |
| JP | 62-19907 | 9/1987 |
| JP | 7-158412 | 6/1995 |
| JP | 07-038796 | 7/1995 |
| JP | 07-038796 U | 7/1995 |
| JP | 3149065 U | 3/2009 |
| KR | 10-2001-009047 A | 11/2001 |
| KR | 10-2004-0099122 A | 11/2004 |
| KR | 10-2015-0005777 A | 1/2015 |

* cited by examiner

CAMSHAFT DEVICE AND METHOD FOR MANUFACTURING CAMSHAFT DEVICE

TECHNICAL FIELD

The present invention relates to a camshaft device and a method for manufacturing the camshaft device, and more particularly, to a camshaft device, which allows a plurality of components to be assembled to a main shaft, and a method for manufacturing the camshaft device.

BACKGROUND ART

In general, the camshaft device is a component in charge of opening/closing of an intake valve and an exhaust valve, conforming to the rotation of an internal combustion engine, and may include: a shaft functioning as a rotation axis; a cam lobe for adjusting a stroke, that is, the timing and length of opening/closing the intake valve and the exhaust valve of the engine; and a journal bearing functioning as a rotating stator.

Only a slight change in the curve of such a camshaft lobe causes a change in the opening/closing timing or the lift of each valve, and thereby affects the performance of the engine. Therefore, the lobe and the shaft in related arts mainly employ an iron-based material such as cast iron or cast steel which can secure durability even under a long-term use.

DISCLOSURE OF THE INVENTION

Technical Problem

Methods such as casting, welding, or powder sintering are employed as methods for mass-production of a camshaft device. In the case of casting, a method was initially used, in which gray cast iron or spheroidal graphite iron is casted, and then portions of lobes and journals are surface treated through a heat treatment method such as high-frequency or nitriding heat treatment and then processed. The method was economical but had problems such as a casting defect and weight reduction. Recently, in order to minimize the problems of weight reduction and a casting defect, a method of manufacturing through centrifugal casting in a hollow state, but the method is less competitive in view of weight reduction than a hollow method using powder.

At present, most camshaft devices widely employ a method in which powder lobes are joined to a hollow steel pipe during a powder sintering process and journals are joined through brazing, and a method in which weight production can be further obtained than in casting by more than 30% and than in hollow casting by more than 10%. However, also in the hollow powder sintering assembly type, further weight reduction and cost reduction are demanded for downsizing of an engine and for controlling variable valve timing (VVT).

On the basis of such demands, in order to satisfy both weight reduction and cost reduction, there have been research and development for manufacturing through mold casting and die casting after firstly inserting an iron-based lobe material into a casting mold through aluminum casting. However, the aluminum casting is limited in actual application due to the problems in that enduring toughness as a camshaft is insufficient due to a casting defect, and even though the iron-based lobe has inverted protrusions and recesses so as to be fixed when an aluminum shaft is solidified due to a difference in thermal expansion coefficients of the aluminum shaft and the iron-based lobe, a contraction defect occurs during joining.

In addition, a camshaft device with such an assembly method required a subsequent joining process for fixing components at regular positions so as to prevent free rotation of the components after the components were assembled.

In addition, in the case of the cam lobe among the components, when considering the size of the journal bearing, there was a problem in that the load-bearing thickness of a portion of the cam lobe became too thin to weaken durability.

The present invention is provided to solve various problems including the above-mentioned problems. In the present invention, journal bearings and guide shafts as well as cam lobes are provided as fully assembled types which can be assembled to a main shaft, whereby each component may be manufactured through a material and a method conforming to the characteristic of the component. Thus, the purpose of the present invention is to provide a camshaft device and a method for manufacturing the camshaft, in which: while sufficiently ensuring stiffness and durability for each component, weight reduction may be maximally possible during the total assembly, whereby while ensuring superior characteristics, an ultra lightweight product can be economically manufactured; since a separate joining process may be omitted after the assembly, it is possible to reduce production costs and production time and substantially improve the productivity; and a journal bearing is componentized as a separate component assembled to a main shaft, whereby the load-bearing thickness of a cam lobe can be sufficiently ensured. However, this may be merely illustrative, and thus the present disclosure is not limited thereto.

Technical Solution

According to an embodiment of the present invention, a camshaft includes: a main shaft elongated in a lengthwise direction thereof; at least one cam lobe assembled to the main shaft and eccentrically formed with respect to a rotation axis of the main shaft; at least one journal bearing assembled to the main shaft and provided to rotatably support the main shaft; at least one guide shaft assembled to the main shaft and installed between the cam lobe and another neighboring cam lobe so as to align assembled positions of the cam lobe and the journal bearing.

The main shaft may have: a hollow hole formed on an inner portion thereof so as to have a reduced weight; and a polygonal surface formed on an outer portion thereof corresponding to a direction of an eccentric axis of the cam lobe.

The main shaft may be an extruded article or an injection molded article formed of at least one material selected from among an Al—Si alloy component, an aluminum component, a glass fiber component, a polymer component, and combinations thereof.

The cam lobe may have: a polygonal hole formed on an inner portion thereof corresponding to the polygonal surface of the main shaft; and a cam surface formed on an outer portion thereof and eccentrified in the direction of the eccentric axis.

The cam lobe may be a casting or a powder sintered article formed of at least one material selected from among an Al—Si alloy component, a cast iron component, a titanium component, a polymer component, and combinations thereof.

The journal bearing may have: a polygonal hole formed on an inner portion thereof corresponding to the polygonal surface of the main shaft; and a bearing surface formed on an outer portion thereof.

The journal bearing may be a casting or a powder sintered article formed of at least one material selected from among an Al—Si alloy component, a cast iron component, a bearing material component, and combinations thereof.

The journal bearing may include: an inner diameter part formed of at least one material selected among an Al—Si alloy component, an aluminum component, a glass fiber component, a polymer component, a polymer composite material component, a magnesium component, a titanium component, a steel component, and combinations thereof; and an outer diameter part installed in an outer diameter direction of the inner diameter part and formed of at least one dedicated bearing material selected from among an a white metal component, a babbit metal component, a phosphor bronze component, a lead bronze component, a kelmet component, a zinc bronze component, an Al—Si alloy component, an Al—Sn alloy component, and combinations thereof.

The guide shaft may have: a polygonal hole formed on an inner portion thereof corresponding to the polygonal surface of the main shaft; and a guide surface formed on an outer portion thereof.

The guide shaft may be formed of at least one selected from among an extruded article, a casting, or an injection molded article, which is formed of at least one material selected from among an Al—Si alloy component, a magnesium (Mg), a glass fiber component, a polymer component, or combinations thereof.

The guide surface of the guide shaft may be a polygonal surface or a circular surface, and a cross-section thereof may be a closed type surface, or a partially opened open type surface.

The guide shaft may include: a plurality of blade parts constituting the polygonal hole; and a bridge part configured to connect the blade part and another neighboring blade part.

According to another embodiment of the present invention, a method for manufacturing a camshaft includes: preparing a main shaft formed lengthily in the lengthwise direction thereof; preparing at least one cam lobe assembled to the main shaft and eccentrically formed with respect to a rotation axis of the main shaft; preparing at least one journal bearing assembled to the main shaft and provided to rotatably support the main shaft; preparing at least one guide shaft which may align the assembled position of the cam lobe or the journal bearing; and assembling, to the main shaft, the cam lobe, the journal bearing, and the guide shaft in order.

Advantageous Effects

As described above, according to some embodiments of the present invention, a product may be formed in a fully assembled type, and thereby being manufactured by a material and a method conforming to the characteristic of each of the component. Thus, while ensuring sufficient stiffness for each component, weight reduction may be maximally possible during the total assembly, whereby while ensuring superior characteristics, an ultra lightweight product can be economically manufactured. Since a separate joining process may be omitted after the assembly, production costs and production time can be saved, and a journal bearing is componentized as a separate component assembled to a main shaft, whereby the load-bearing thickness of a cam lobe can be sufficiently ensured. Thus, mass-production can be achieved, whereby the productivity and an economic effect may be improved and good quality products without internal defects may be produced. Also, it is possible to assemble rigidly, thereby having an effect of greatly improving durability. Of cause, the range of the present disclosure is not limited to the above-described effects.

MODE FOR CARRYING OUT THE INVENTION

Figure 1:
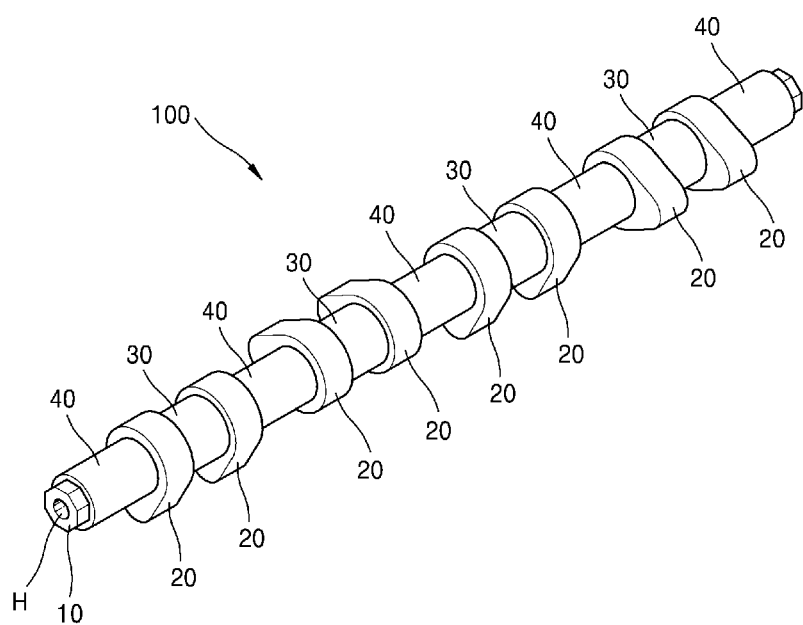
FIG. 1 is a component assembly perspective view of a camshaft device according to some embodiments of the present invention.

Hereinafter, several preferred embodiments of the present invention will be described in detail with reference to the accompanying drawings.

The embodiments of the present invention are provided so that those skilled in the art thoroughly understand the present disclosure, and the following embodiments may be embodied in many different forms and should not be construed as being limited to the embodiments set forth herein. Rather, these embodiments are provided so that this disclosure will be thorough and complete, and will fully convey the scope of the present disclosure to those skilled in the art. Also, in the figures, a thickness or dimension of each of layers is exaggerated for clarity of illustration.

It will be understood that it is referred to as being "on," "connected to", "stacked", or "coupled to" another element, it may be directly on, connected, stacked, or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present disclosure.

Spatially relative terms, such as "above" or "upper" and "below" or "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "above" may encompass both an orientation of above and below. The device may be otherwise oriented (rotated 90 degrees or at other orientations) and the spatially relative descriptors used herein interpreted accordingly.

The terms used herein are for illustrative purposes of the present disclosure only and should not be construed to limit the meaning or the scope of the present disclosure. The terms of a singular form may include plural forms unless referred to the contrary. Also, the expressions "comprise" and/or "comprising" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

Additionally, the embodiment in the detailed description will be described with sectional views as ideal exemplary views of the inventive concept. In the drawings, for example, according to the manufacturing technology and/or tolerance, the modification of the illustrated shape may be expected. Thus, the embodiments of the idea of the present invention must not be interpreted to be limited by a particular shape that is illustrated in the drawings and must include a change in the shape occurring, for example, during manufacturing.

In the embodiments of the present invention, a camshaft device may be referred to as including roughly a shaft, a lobe, and an engagement member. However, in the fact that respect in such a camshaft device, the shaft may be referred to as the camshaft, and he lobe may be referred to as a cam lobe or simply as a cam, it should be understood that the scope of the present invention is not limited to the above terms.

Figure 2:
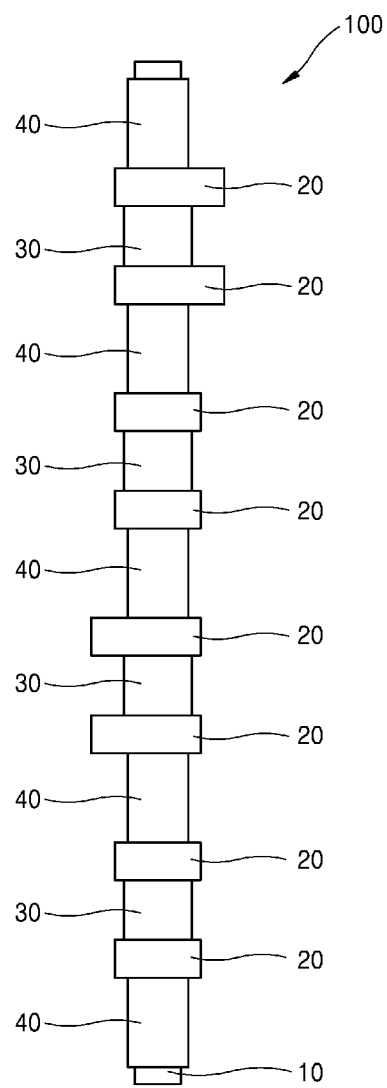
FIG. 2 is a plan view illustrating the camshaft device of FIG. 1.
Figure 3:
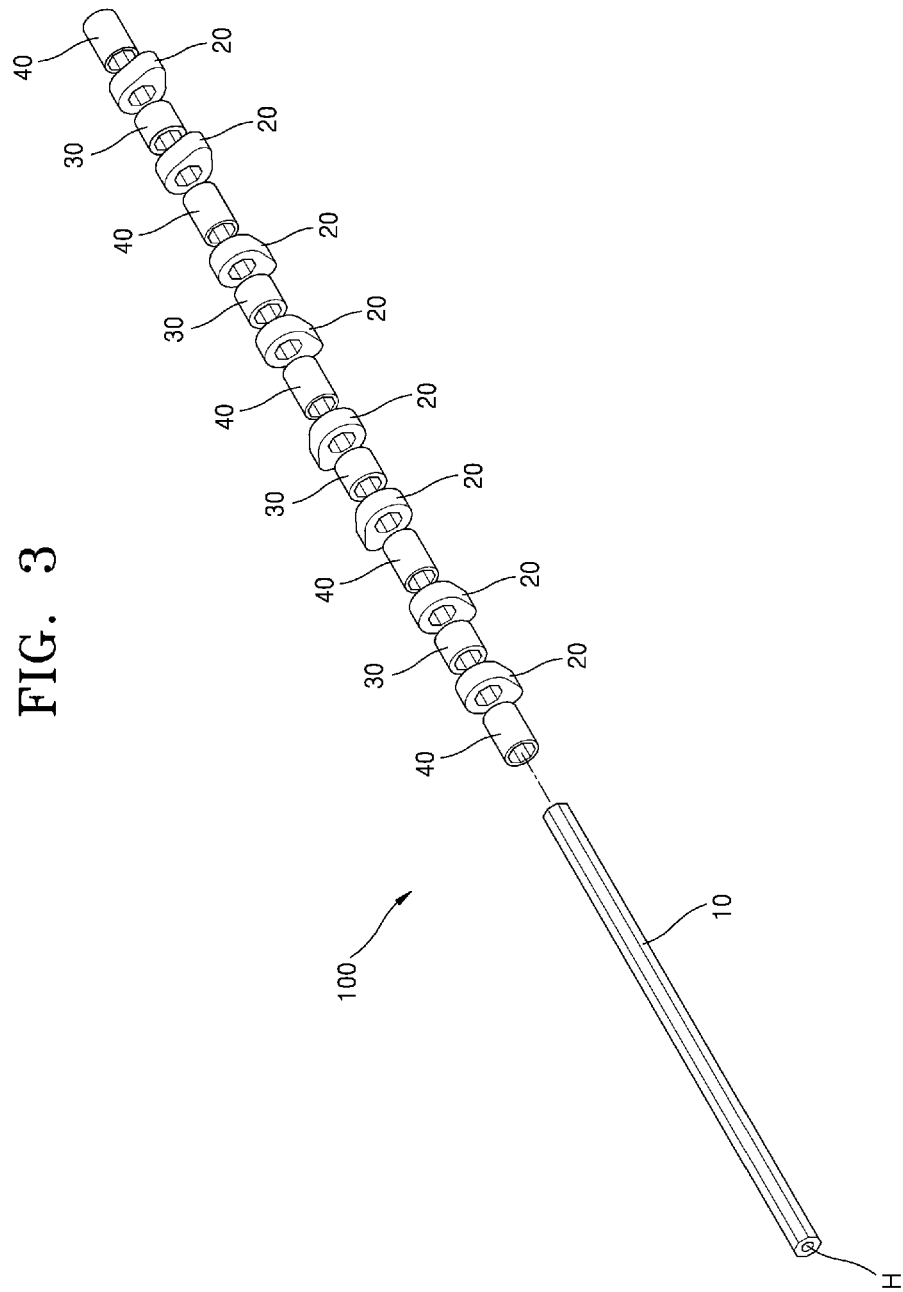
FIG. 3 is a component exploded perspective view illustrating the camshaft device of FIG. 1.
Figure 4:
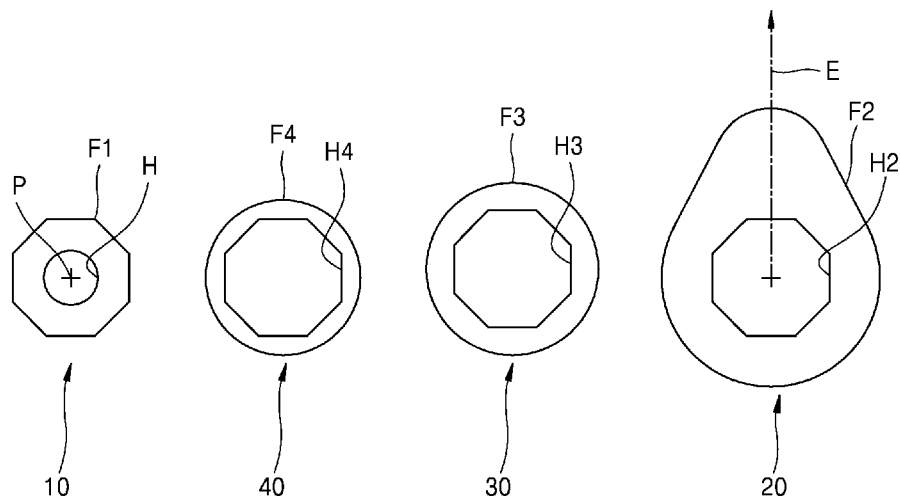
FIG. 4 are front views illustrating front views of components in comparison with each other of the camshaft device of FIG. 1.

FIG. 1 is a component assembly perspective view of a camshaft device 100 according to some embodiments of the present invention, FIG. 2 is a plan view illustrating the camshaft device 100 of FIG. 1, FIG. 3 is a component exploded perspective view illustrating the camshaft device 100 of FIG. 1, and FIG. 4 are front views for illustrating front views of components in comparison with each other of the camshaft device 100 of FIG. 1.

Firstly, as illustrated in FIGS. 1 to 4, a camshaft device 100 according to some embodiments of the present invention may roughly include a main shaft 10, a cam lobe 20, a journal bearing 30, and a guide shaft 40.

For example, as illustrated in FIGS. 1 to 4, the main shaft 10 is a columnar structure elongated in the lengthwise direction and serving as a center, the main shaft 10 has a hollow hole H therein so as to a have small weight, and may have polygonal surfaces F1 on an outer portion thereof so as to correspond to the direction of eccentric axis E of the cam lobe 20, that is, may be an octagonal column shape having polygonal surfaces therein in the drawings. However, such a polygonal surface F1 may be a kind of a key structure which prevents free rotation of the cam lobe 20, the journal 30, and the guide shaft 40 caused by the rotation of the main shaft 10, and but not limited to the octagonal surface, various numbers of sides, such as tetragonal, hexagonal, and dodecagonal sides may be used.

For example, such the number of sides may be determined according to an installation angle of the cam lobe 20 to be described later. In FIGS. 1 to 4, in case of a four-cylinder engine in which two intake valve shafts or exhaust valve shafts are installed for each cylinder according to the number of valve shafts installed over a cylinder of an internal combustion engine, a total of eight cam lobes 20, in which pairs are formed by each two lobes and disposed at regular intervals of 90 degree, are needed. As, such, the number of sides may be determined by considering the number of cam lobes 20 and the shape of disposition at regular angle intervals.

That is, the number of sides of the polygonal surface F1 may be formed in plurality at regular angle intervals around the rotation center of the main shaft 10, considering the number of engine cylinders and the number of installed valves. In the case of a three-cylinder engine, the polygonal surface maybe a hexagon or a nonagon so as to achieve a phase difference of 120 degrees, and in the case of a four-cylinder engine, may be a tetragon, an octagon, or a dodecagon so as to achieve a phase difference of 90 degrees. In addition, in the case of a five-cylinder engine, the polygonal surface maybe a pentagon or a decagon so as to achieve a phase difference of 72 degrees, and in the case of a six-cylinder engine, may be a hexagon or an nonagon so as to achieve a phase difference of 60 degrees, and in the case of a eight-cylinder engine, may be a tetragon, an octagon, or a dodecagon so as to achieve a phase difference of 90 degrees. Besides, in the case of engines having more cylinders than the above, various polygonal surfaces may be achieved according to phase differences of the cylinders.

Of course, such the camshaft device 100 of the present invention may be applied, but not necessarily limited to an engine, to all rotary shafts which are widely used for various types of device or equipment in which a lobe is installed.

More specifically, for example, the main shaft 10 may be an extruded article or an injection molded article which is formed of at least one material selected from among an Al—Si alloy component, an aluminum component, a glass fiber component, a polymer component, a polymer composite material component, a magnesium component, a titanium component, a steel component, or combinations thereof. However, the embodiments are not limited thereto, and the main shaft may be manufactured in various types and shapes.

Accordingly, using such the hollow hole H, extrusion forming, or the like, the main shaft 10 can be allowed to have maximally reduced weight, and thereby have superior strength to structures, which does not have a hole, due to the structure with a mechanically formed while having excellent characteristics, whereby a high-strength product may be manufactured.

In addition, for example, as illustrated in FIGS. 1 to 4, the cam lobe 20 may be a plurality of cam structures which are assembled to the main shaft 10 and eccentrically formed with respect to the rotation axis P of the main shaft 10.

The cam lobe 20 may have a polygonal hole H2, which is formed therein corresponding to the polygonal surface F1 of the main shaft 10, so as to be passed through and assembled to the main shaft 10, and have a cam surface F2 which is eccentrified toward the eccentric shaft E on an outer portion thereof so as to contact the valve shaft and open/close the intake valve or the exhaust valve.

More specifically, for example, the cam lobe 20 may be a casting or a powder sintered article formed of at least one material selected from among an Al—Si alloy component, a cast iron component, a titanium component, a polymer component, and combinations thereof. However, the embodiments are not limited thereto, and the cam lobe may be manufactured in various types and shapes.

The cam lobe 20 may employ, but not limited thereto, a cast iron-based material such as ductile cast iron, gray cast iron or chilled cast iron, a cast steel-based material such as carbon steel, alloy steel or nitriding steel, or a titanium alloy material such as $Ti_6Al_4V$ or a titanium composite material.

In addition, the cam lobe 20 may be extruded by using the above-described material so that the structure thereof is densified and the weight reduction and productivity of the product may be improved. However, the embodiments are not limited thereto and the cam lobe 20 may be manufactured through various methods such as an in-situ synthesis.

Thus, since the cam lobe 20 is not required to have a sufficiently large inner diameter in order to pass through an existing journal bearing and be assembled, the durability and stiffness of the component may be substantially improved by sufficiently ensuring a load-bearing thickness of the cam lobe 20.

In addition, for example, as illustrated in FIGS. 1 to 4, the journal bearing 30 may be a plurality of block structures which may be assembled to the main shaft 10 and rotatably support the main shaft 10.

Here, the journal bearing 30 may have: a polygonal hole H3 therein corresponding to the polygonal surface F1 of the main shaft 10 so as to be passed through and assembled to the main shaft 10; and a bearing surface F3 having a circular outer surface on the outer surface thereof so that portions of the main shaft 10 between the cam lobe 20 and neighboring cam lobe 20 are rotatably supported by a cylinder block (not shown). Here, the surface of the bearing surface F3 may be processed so as to have a smooth surface to reduce friction.

More specifically, for example, the journal bearing 30 may be a casting or a powder sintered article formed of at least one material selected from among an Al—Si alloy component, a cast iron component, a bearing material component, and combinations thereof. However, the embodiments are not limited thereto, and the journal bearing may be manufactured in various types and shapes.

Thus, the journal bearing 30 may also be formed in an assembled type and manufactured by using a material and method suitable for the characteristics of each component, and thus the journal bearing may be allowed to have maximally reduced weight during assembly in totality while sufficiently ensuring superior strength by each component. Therefore, an ultra-lightweight product may be economically manufactured while ensuring superior characteristic.

In addition, for example, as illustrated in FIGS. 1 to 4, the guide shaft 40 is assembled to the main shaft 10, and may be a plurality of spacer blocks of one type, which is installed between the cam lob 20 and another neighboring cam lobe 20 or installed to contact the cam lobe 20 so that the assembled position of the cam lobe 20 or the journal bearing 30 is aligned.

For example, as illustrated in FIGS. 1 to 4, the guide shaft 40 may have: a polygonal hole H4 formed therein corresponding to the polygonal surface F1 of the main shaft 10 so as to be passed through and assembled to the main shaft 10; and a guide surface F4 having a certain width on the outer portion thereof so that the cam lobes 20 or the journal bearings 30 are aligned in accurate positions.

Thus, since the positions of each component may be accurately positioned by using the guide shaft 40, a separate bonding process, such as welding or adhesion which was performed in related arts after assembly, may be omitted, whereby reducing the production costs and production time.

More specifically, for example, the guide shaft 40 may be formed of at least one selected from among an extruded article, a casting, or an injection molded article, which is consisting of at least one material selected from among an Al—Si alloy component, a magnesium (Mg) component, a glass fiber component, a polymer component, or combinations thereof. However, the embodiments are not limited thereto, and the guide shaft may be manufactured in various types and shapes.

Figure 5:
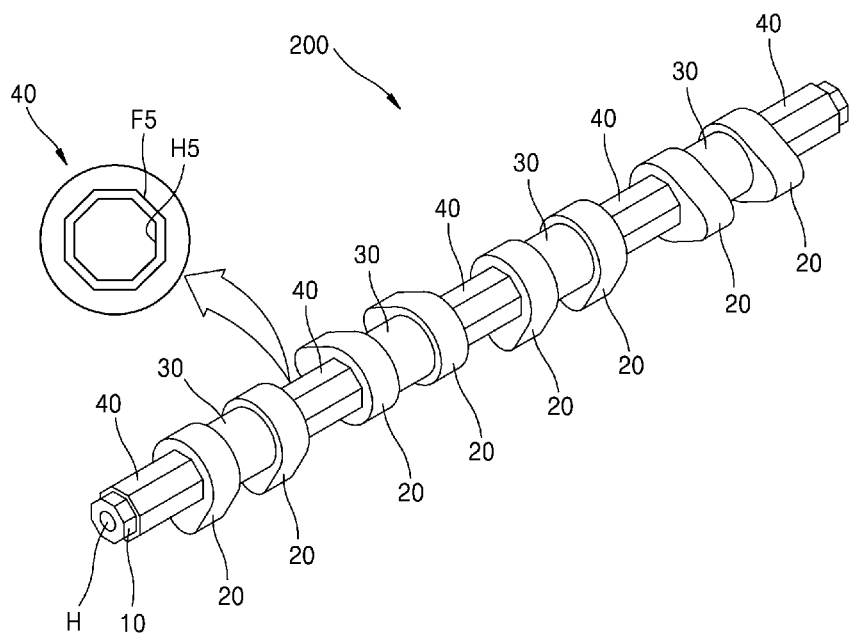
FIG. 5 is a component assembly perspective view of a camshaft device according to some other embodiments of the present invention.

FIG. 5 is a component assembly perspective view of a camshaft 200 according to some other embodiments of the present invention.

As illustrated in FIG. 5, a guide shaft 40 of a camshaft device 200 according to some other embodiments of the present invention may have: a polygonal hole H5 formed therein corresponding to a polygonal surface F1 of a main shaft 10; and a polygonal, that is, octagonal, guide surface F5 on the outer portion thereof, and the cross-section illustrated in the enlarged portion of FIG. 5 may be closed, that is, may be a closed type cross-section.

That is, the outer portion of the guide shaft 40 may be formed in various shapes, such as an octagonal surface of FIG. 5 besides the circular cylindrical surfaces of FIGS. 1 to 4, and thereby partially adjusting strength, or may be allowed to maximally correspond to the shape of the polygonal hole H5, whereby the weight reduction of the guide shaft 40 may be possible by slimming.

Figure 6:
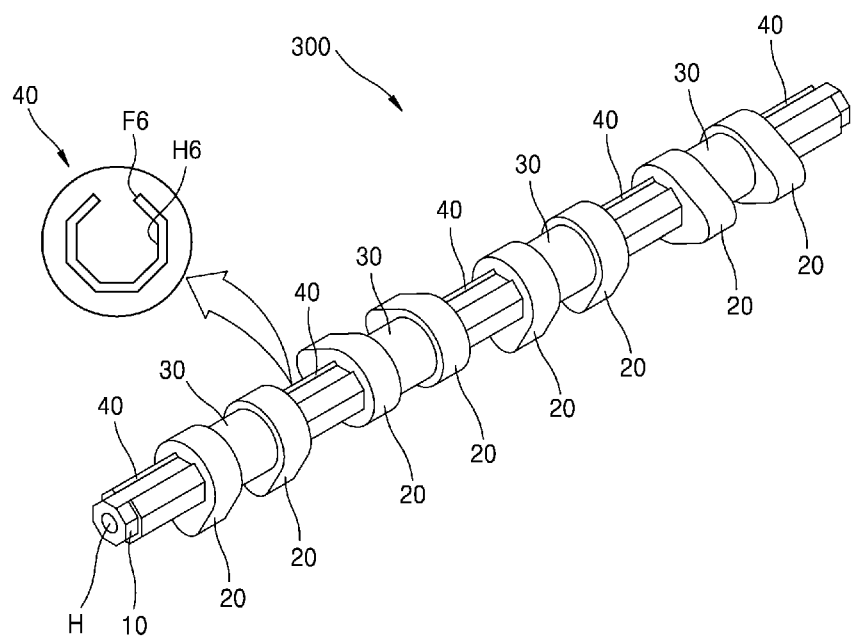
FIG. 6 is a component assembly perspective view of a camshaft device according to still some other embodiments of the present invention.

FIG. 6 is a component assembly perspective view of a camshaft 300 according to still some other embodiments of the present invention.

As illustrated in FIG. 6, a guide shaft 40 of a camshaft device 300 according to still some other embodiments of the present invention may have: a polygonal hole H6 formed therein corresponding to a polygonal surface F1 of a main shaft 10; and a polygonal guide surface F6, and the cross-section illustrated in the enlarged portion of FIG. 6 may be a partially opened type, that is, a C-type cross-section.

Such the partially opened type guide shaft 40 may further reduce the weight of a product by slimming portions while remaining indispensable portions serving as spacers which align each component at regular positions.

Figure 7:
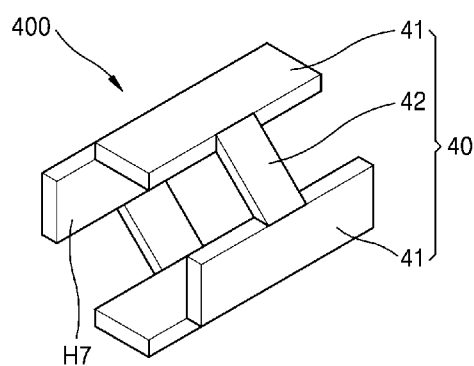
FIG. 7 is a perspective view of a guide shaft of a camshaft device according to yet some other embodiments of the present invention.

FIG. 7 is a perspective view of a guide shaft 40 of a camshaft device 400 according to further some other embodiments of the present invention.

That is, as another example of such slimming, a guide shaft 40 of a camshaft device 400 according to further some other embodiments of the present invention may include: a plurality of blade part 41 forming a polygonal hole H7; and a bridge part 42 which connects the blade part 41 to another neighboring blade part 41. Besides, for the guide shaft 40, various shapes and types which further reduce the weight of a product by slimming portions while remaining indispensable portions serving as spacers which align each component at regular positions.

Figure 8:
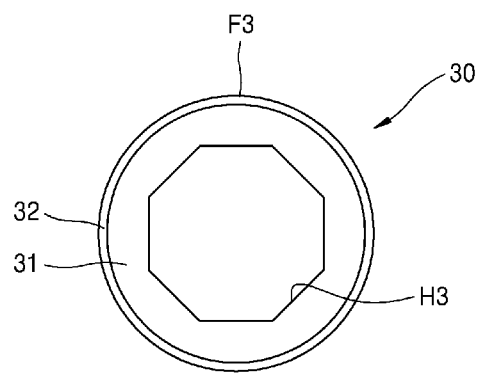
FIG. 8 is a cross-sectional view illustrating a journal bearing according to further some other embodiments of the present invention.

FIG. 8 is a cross-sectional view illustrating a journal bearing 30 according to yet some other embodiments of the present invention.

As illustrated in FIG. 8, the journal bearing 30 may be formed of a dual material. That is, the journal bearing 30 may include an inner diameter part 31 formed of at least one selected from among an Al—Si alloy component, an aluminum component, a glass fiber component, a polymer component, a polymer composite material component, a magnesium component, a titanium component, a steel component, and combinations thereof; and an outer diameter part 32, which is installed in the outer diameter direction of the inner diameter part, formed of at least one dedicated bearing material selected from among an a white metal component, a babbit metal component, a phosphor bronze component, a lead bronze component, a kelmet component, a zinc bronze component, an Al—Si alloy component, an Al—Sn alloy component, and combinations thereof.

Thus, weight reduction is achieved by using the inner diameter part 31 formed of a relatively lightweight material, and at the same time, sufficient wear-resistance and stiffness may be achieved by using the outer diameter part 32 formed of a relatively rigid material.

Figure 9:
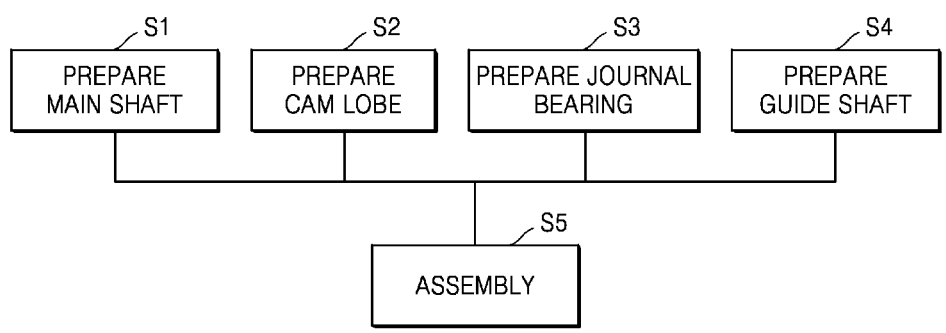
FIG. 9 is a flowchart illustrating a method for manufacturing a camshaft device according to some embodiments of the present invention.

FIG. 9 is a flowchart illustrating a method for manufacturing a camshaft device according to some embodiments of the present invention.

As illustrated in FIGS. 1 to 4, and 9, a method for manufacturing a camshaft device 100 according to some embodiments of the present invention may include: a step S1 for preparing a main shaft 10 formed lengthily in the lengthwise direction thereof; a step S2 for preparing at least one cam lobe 20 assembled to the main shaft and eccentrically formed with respect to a rotation axis of the main shaft 10; a step S3 for preparing at least one journal bearing 30 assembled to the main shaft and provided to rotatably support the main shaft 10; a step S4 for preparing at least one guide shaft 40 which may align the assembled position of the cam lobe 20 or the journal bearing 30; and a step S5 for assembling, to the main shaft 10, the cam lobe 20, the journal bearing 30, and the guide shaft 40 in order.

For example, in the preparing of the main shaft 10, a circularly cylindrical billet including an aluminum component may be prepared, and for the billet, 2000 series, 4000 series, 5000 series, 6000 series, or 7000 series aluminum material may be used, and in addition to the aluminum materials, a magnesium alloy, a titanium alloy, etc. may be used.

In addition, the billet may be extruded using aluminum in order to densify the structure thereof. Of course, besides, the billet may be manufactured through various methods, such as, casting, forging, extrusion, powder sintering, or die casting.

The description of the present invention is intended to be illustrative, and those with ordinary skill in the technical field of the present invention pertains will be understood that the present invention can be carried out in other specific forms without changing the technical idea or essential features. Hence, the real protective scope of the present invention shall be determined by the technical scope of the accompanying Claims.

INDUSTRIAL APPLICABILITY

As described above, according to some embodiments of the present invention, a product may be formed in a fully assembled type, and thereby being manufactured by a material and a method conforming to the characteristic of each of the component. Thus, while ensuring sufficient stiffness for each component, weight reduction may be maximally possible during the total assembly, whereby while ensuring superior characteristics, an ultra lightweight product can be economically manufactured and costs can be reduced. Since a separate joining process may be omitted after the assembly, production costs and production time can be saved, and a journal bearing is componentized as a separate component assembled to a main shaft, whereby the load-bearing thickness of a cam lobe can be sufficiently ensured. Thus, mass-production can be achieved, whereby the productivity and an economic effect may be improved and manufacturing costs may be reduced.

The invention claimed is:

1. A camshaft device comprising:
a main shaft elongated in a lengthwise direction thereof;
at least one cam lobe assembled to the main shaft and eccentrically formed with respect to a rotation axis of the main shaft;
at least one journal bearing assembled to the main shaft and provided to rotatably support the main shaft; and
at least one guide shaft assembled to the main shaft and installed between the cam lobe and another neighboring cam lobe so as to align assembled positions of the cam lobe and the journal bearing,
wherein the main shaft comprises:
a hollow hole formed on an inner portion thereof so as to have a reduced weight; and
a polygonal surface formed on an outer portion thereof corresponding to a direction of an eccentric axis of the cam lobe,
wherein the guide shaft comprises:
a first polygonal hole formed on an inner portion thereof corresponding to the polygonal surface of the main shaft,
a guide surface formed on an outer portion thereof,
a plurality of blade parts constituting the first polygonal hole; and
a bridge part configured to connect the blade part and another neighboring blade part.

2. The camshaft device of claim 1, wherein the main shaft is an extruded article or an injection molded article formed of at least one material selected from among an Al—Si alloy component, an aluminum component, a glass fiber component, a polymer component, a polymer composite material component, a magnesium component, a titanium component, a steel component, and combinations thereof.

3. The camshaft device of claim 1, wherein the cam lobe comprises:
a second polygonal hole formed on an inner portion thereof corresponding to the polygonal surface of the main shaft; and
a cam surface formed on an outer portion thereof and eccentrified in the direction of the eccentric axis.

4. The camshaft device of claim 1, wherein the cam lobe is a casting or a powder sintered article formed of at least one material selected from among an Al—Si alloy component, a cast iron component, a titanium component, a polymer component, and combinations thereof.

5. The camshaft device of claim 1, wherein the journal bearing comprises:
a third polygonal hole formed on an inner portion thereof corresponding to the polygonal surface of the main shaft; and
a bearing surface formed on an outer portion thereof.

6. The camshaft device of claim 1, wherein the journal bearing is a casting or a powder sintered article formed of at least one material selected from among an Al—Si alloy component, a cast iron component, a bearing material component, and combinations thereof.

7. A camshaft device comprising:
a main shaft elongated in a lengthwise direction thereof
at least one cam lobe assembled to the main shaft and eccentrically
formed with respect to a rotation axis of the main shaft;
at least one journal bearing assembled to the main shaft and provided to rotatably support the main shaft; and
at least one guide shaft assembled to the main shaft and installed between the cam lobe and another neighboring cam lobe so as to align assembled positions of the cam lobe and the journal bearing wherein the journal bearing comprises:
an inner diameter part formed of at least one material selected from among an Al—Si alloy component, an aluminum component, a glass fiber component, a polymer component, a polymer composite material component, a magnesium component, a titanium component, a steel component, and combinations thereof; and
an outer diameter part installed in an outer diameter direction of the inner diameter part and formed of at least one dedicated bearing material selected from among a white metal component, a babbit metal component, a phosphor bronze component, a lead bronze component, a kelmet component, a zinc bronze component, an Al—Si alloy component, an Al—Sn alloy component, and combinations thereof.

8. A camshaft device comprising:
a main shaft elongated in a lengthwise direction thereof;
at least one cam lobe assembled to the main shaft and eccentrically formed with respect to a rotation axis of the main shaft;
at least one journal bearing assembled to the main shaft and provided to rotatably support the main shaft; and
at least one guide shaft assembled to the main shaft and installed between the cam lobe and another neighboring cam lobe so as to align assembled positions of the cam lobe and the journal bearing wherein the guide shaft is provided formed of at least one selected from among an extruded article, a casting, or an injection molded article, which is formed of at least one material selected from among an Al—Si alloy component, a magnesium (Mg), a glass fiber component, a polymer component, or combinations thereof.

9. A method for manufacturing a camshaft, the method comprising:
preparing a main shaft formed lengthily in the lengthwise direction thereof;
preparing at least one cam lobe assembled to the main shaft and eccentrically formed with respect to a rotation axis of the main shaft;
preparing at least one journal bearing assembled to the main shaft and provided to rotatably support the main shaft;
preparing at least one guide shaft so as to align the assembled position of the cam lobe or the journal bearing; and
assembling, to the main shaft, the cam lobe, the journal bearing, a second cam lobe and the guide shaft in order, wherein the main shaft comprises:
a hollow hole formed on an inner portion thereof so as to have a reduced weight; and
a polygonal surface formed on an outer portion thereof corresponding to a direction of an eccentric axis of the cam lobe,
wherein the guide shaft comprises:
a polygonal hole formed on an inner portion thereof corresponding to the polygonal surface of the main shaft; and
a guide surface formed on an outer portion thereof, and
wherein the guide shaft comprises:
a plurality of blade parts constituting the polygonal hole; and
a bridge part configured to connect the blade part and another neighboring blade part.

* * * * *